United States Patent
Franklin

(10) Patent No.: US 7,844,520 B1
(45) Date of Patent: Nov. 30, 2010

(54) METHOD AND APPARATUS FOR MONITORING CREDIT REPORTS USING A COMPUTING SYSTEM IMPLEMENTED FINANCIAL MANAGEMENT SYSTEM

(75) Inventor: Martin Franklin, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 116 days.

(21) Appl. No.: 11/444,553

(22) Filed: May 31, 2006

(51) Int. Cl.
*G06Q 40/00* (2006.01)
(52) U.S. Cl. .............................. 705/35; 705/38; 705/42
(58) Field of Classification Search ................... 705/35, 705/38, 39; 707/1–6
See application file for complete search history.

(56) References Cited

U.S. PATENT DOCUMENTS

| | | | | |
|---|---|---|---|---|
| 5,644,727 | A * | 7/1997 | Atkins | 705/40 |
| 6,935,558 | B2 * | 8/2005 | Washington et al. | 235/380 |
| 2002/0116323 | A1 * | 8/2002 | Schnall | 705/38 |
| 2003/0050879 | A1 * | 3/2003 | Rosen et al. | 705/35 |
| 2005/0154664 | A1 * | 7/2005 | Guy et al. | 705/35 |
| 2006/0085332 | A1 * | 4/2006 | Imrey et al. | 705/39 |
| 2006/0106700 | A1 * | 5/2006 | Boren et al. | 705/35 |
| 2007/0050285 | A1 * | 3/2007 | Freeman | 705/38 |
| 2007/0299771 | A1 * | 12/2007 | Brody et al. | 705/38 |

OTHER PUBLICATIONS

QuickXpense introduces automatic pre-population of expense reports by Miailovich, Jill, Business Wire, May 8, 1995, Sec. 1. p. 1.*
ConsumerInfo.com partners with Intuit to supply Quicken Deluxe 6.0 users with quick, easy access to credit reports, Business Wire, Oct. 29, 1996.*
Quicken 2002 Deluxe for Macintosh Provides Consumers with an easy and powerful way to manage their finances, Press Release, Aug. 22, 2001 http://web.intuit.com/about_intuit/press_releases/2001/08-22b.html.*

* cited by examiner

*Primary Examiner*—James A Kramer
*Assistant Examiner*—Martin A Gottschalk
(74) *Attorney, Agent, or Firm*—Gunnison, McKay & Hodgson, L.L.P.; Philip McKay

(57) ABSTRACT

A method and apparatus for monitoring credit reports using a computing system implemented financial management system includes a process for monitoring credit reports whereby data representing various credit accounts is obtained and categorized by a computing system implemented financial management system. This computing system implemented financial management system data is then stored. A credit report is then obtained and credit report data representing the various credit account information contained in the credit report is obtained and stored. Then, the computing system implemented financial management system data and credit report data are compared and any discrepancies between the two credit data sources is brought to the attention of the user and/or included in a credit discrepancy report which is then provided to the user.

36 Claims, 4 Drawing Sheets

FIG.3A

```
Payee: HOMETOWN BANK USA
Payee Address:  1 Main Street, Anytown, AnyState, USA 01234
Account Number:  1234-1234-1234-1234
Payment amount: $100.00
Payment date: 05/01/2006
Payment Frequency:  Monthly
Type: Car Loan
```

FIG.3B

```
Account: HOMETOWN BANK USA
Address:  1 Main Street, Anytown, AnyState, USA 01234
Account Number:  1234-1234-1234-1234
Status: Paid/Never late
Date Opened: 06/05/2004
Type:  Installment
Reported Since: 06/2004
Term: 24 Months
Date of Status: 06/05/2006
Monthly Payment: $100.00
Last Reported: 05/05/2006
Responsibility: Individual  Credit Limit/Car Loan
Original Amount: $2000.00
High Balance: $2000.00
Recent Balance: $200.00
Recent Payment: $100.00 on 05/05/2006
```

METHOD AND APPARATUS FOR MONITORING CREDIT REPORTS USING A COMPUTING SYSTEM IMPLEMENTED FINANCIAL MANAGEMENT SYSTEM

BACKGROUND

In most modern financial systems, and particularly in the western world, an individual's credit rating is fast becoming one of the most important assets in the individual's procession. Consequently, monitoring and tracking of credit accounts and credit ratings, as well as preventing credit related crimes, such as identity (ID) theft, is a significant concern for most consumers.

In an effort to help consumers keep track of their credit activity, recent legislation in the United States requires the major credit reporting agencies to provide each consumer one free copy of their credit report each year. Currently, this free credit report can be obtained through the website https://www.annualcreditreport.com/cra/index.jsp.

The legislated free annual credit report provides consumers with an annual, or more often than annually for a fee, opportunity to check their listed credit accounts and ensure that the credit report includes no incorrect or illegitimate credit activity and that the consumer's various credit accounts have not been subject to ID theft/fraud activity. A typical credit report can be quite lengthy for an average consumer and, in some cases, confusing, intimidating and difficult to decipher. Currently, in order to check the accuracy of a credit report, a consumer must first obtain the credit report, usually a hard copy, and then, line by line, entry by entry, compare, typically visually, the credit report against known, credit accounts, often located in one or more other websites and/or locations. Each credit account entry must then be confirmed more or less manually.

Many consumers also monitor, track, manipulate and maintain various credit accounts using one or more computing system implemented financial management systems. Currently, various computing system implemented financial management systems are available including: computing system implemented personal and small business financial management systems; computing system implemented tax preparation systems; computing system implemented business accounting systems; and computing system implemented medical expense management systems; as well as various other electronic transaction data driven financial management systems.

Computing system implemented financial management systems help users manage their finances, including credit accounts, by providing a centralized interface with banks, credit card companies, and other various financial institutions, for electronically identifying and categorizing user financial transactions. Currently, computing system implemented financial management systems typically obtain electronic transaction based information, such as payee, payment amount, date, etc. via communication with banks, credit card providers, or other financial institutions, using electronic data transfer systems such as the Open Financial Exchange (OFX) specification, Web Direct, or various systems for transferring financial transaction data.

Currently, Computing system implemented financial management systems do not provide for interfacing with, or manipulating data presented in, a typically credit report, such as the freely provided annual credit reports discussed above.

SUMMARY

In accordance with one embodiment, a method and apparatus for monitoring credit reports using a computing system implemented financial management system includes a process for monitoring credit reports whereby data representing various credit accounts, and specific credit related transactions, is obtained and categorized by a computing system implemented financial management system. The computing system implemented financial management system credit account data is then stored.

In one embodiment, a credit report is then obtained and credit report data representing the various credit account information contained in the credit report is obtained and stored. Then, according to one embodiment, the computing system implemented financial management system credit account data and the credit report credit account data are compared and any discrepancies between the two credit data sources is brought to the user's attention and/or included in a credit discrepancy report which is then provided to the user.

In one embodiment the credit report credit account data is obtained by the process for monitoring credit reports disclosed herein by scanning in a copy of the credit report and parsing and/or copying the relevant credit report credit account data from the scanned copy of the credit report. In one embodiment, the credit report credit account data is obtained by the process for monitoring credit reports disclosed herein from a PDF or HMTL copy of the credit report. In one embodiment, the credit report credit account data is obtained by the process for monitoring credit reports disclosed herein by manually entering the credit data into a computing system implementing the process for monitoring credit reports disclosed herein.

In one embodiment the process for monitoring credit reports disclosed herein generates a reminder, in the form of a pop-up display or other screen display, e-mail, or other electronic or non-electronic means, to remind the user of the process for monitoring credit reports disclosed herein to obtain a recent credit report at user-defined and/or provider-defined intervals, such as annually for the free credit reports discussed above.

In one embodiment, if a discrepancy is found between the credit account data from the computing system implemented financial management system and the credit account data from the credit report with respect to a specific credit account or specific credit transaction, the user is asked to confirm the discrepancy and is given the opportunity to label the credit account, or transaction, as a suspected incorrect and/or fraud event.

In one embodiment, once a credit account or specific credit transaction is labeled as a suspected incorrect and/or fraud event, the process for monitoring credit reports disclosed herein directs the user to a website or database where the user is provided instructions and/or forms for challenging a credit account and/or transaction and/or report an instance of credit fraud and/or ID theft.

In one embodiment, once a credit account or specific credit transaction is labeled as a suspected incorrect and/or fraud event, the credit data collected from the computing system implemented financial management system and/or the credit report credit account data is used to fill out forms used to challenge a credit account or transaction and/or report an instance of credit fraud and/or ID theft.

The method and apparatus for monitoring credit reports using a computing system implemented financial management system disclosed herein provides a user/consumer with the ability to use credit account data collected by a computer implemented financial management system to check the accuracy of the user's/consumer's credit report. Consequently, using the method and apparatus for monitoring credit reports using a computing system implemented financial management system disclosed herein, a user/consumer can readily detect mistakes in their credit report and/or fraudulent activity involving the user's/consumer's credit and/or identity. Therefore, The method and apparatus for monitoring credit reports using a computing system implemented financial management system disclosed herein allows the user to receive greater benefit and security from credit reports, including the newly legislated free annual credit reports.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3A shows an exemplary data format as would typically be created for a single credit account by an exemplary computing system implemented financial management system;

FIG. 3B shows an exemplary data format for the single credit account of FIG. 3A as would typically created be obtained from an exemplary credit report by an exemplary credit reporting agency.

Figure 1:
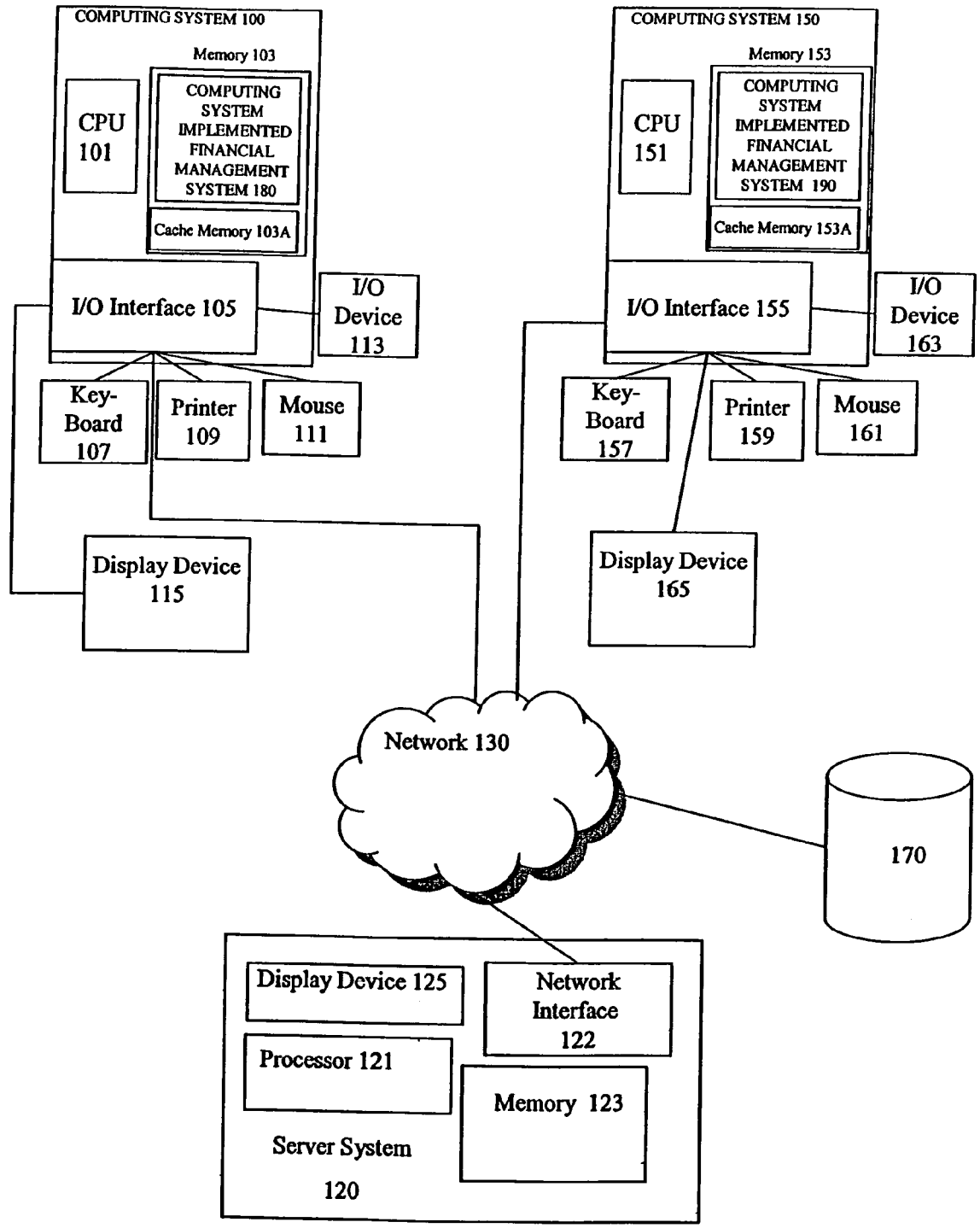
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and apparatus for monitoring credit reports using a computing system implemented financial management system includes a process for monitoring credit reports (200 in FIGS. 2 and 400 in FIG. 4) whereby data representing various credit accounts, and specific credit related transactions, (FIG. 3A) is obtained (203 in FIGS. 2 and 403 in FIG. 4) and, in one embodiment, categorized by a computing system implemented financial management system (180 and 190 in FIG. 1). The computing system implemented financial management system credit account data is then stored (205 in FIG. 2 and 405 in FIG. 4).

Figure 2:
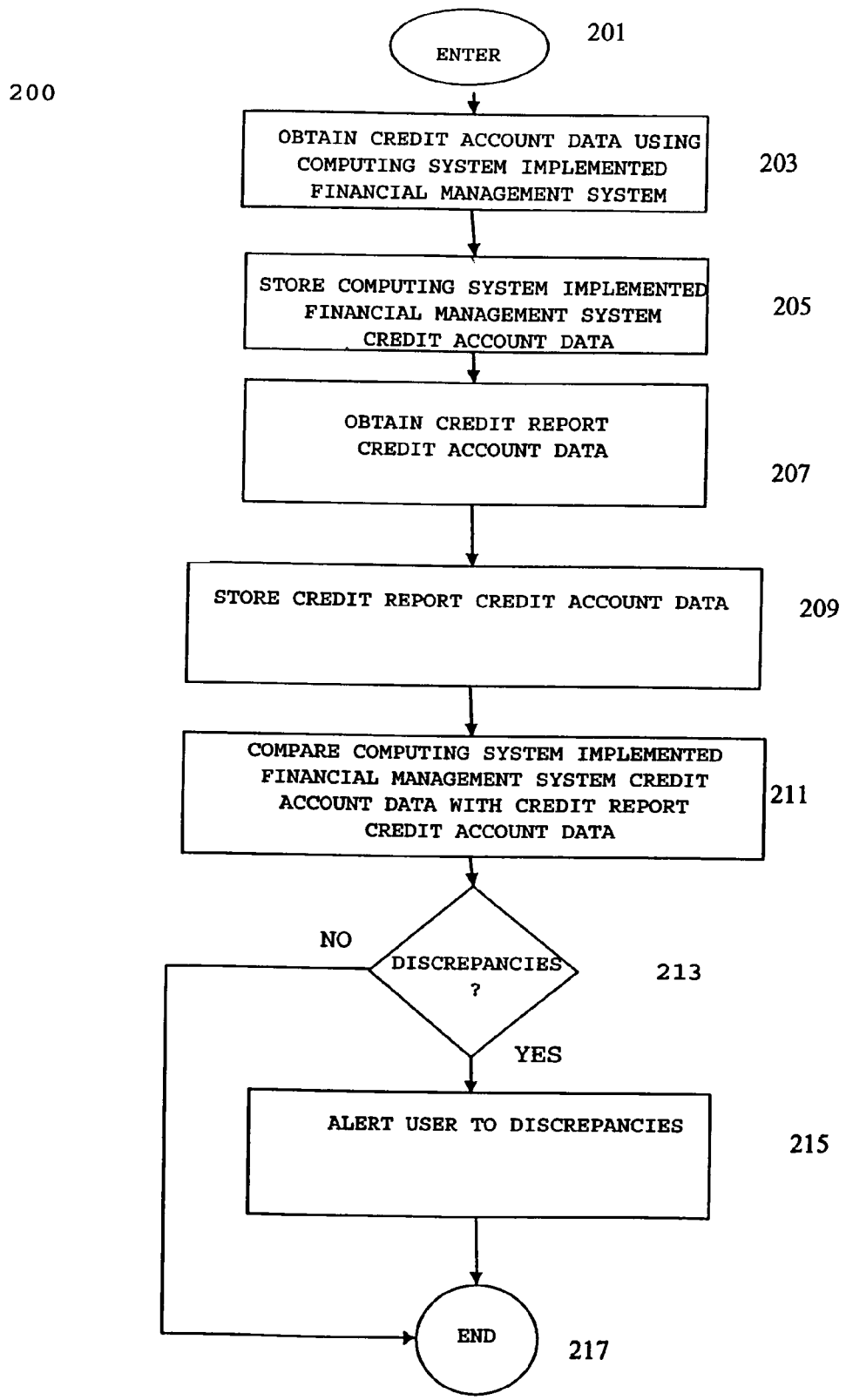
FIG. 2 is a flow chart depicting a process for monitoring credit reports in accordance with one embodiment.
Figure 4:
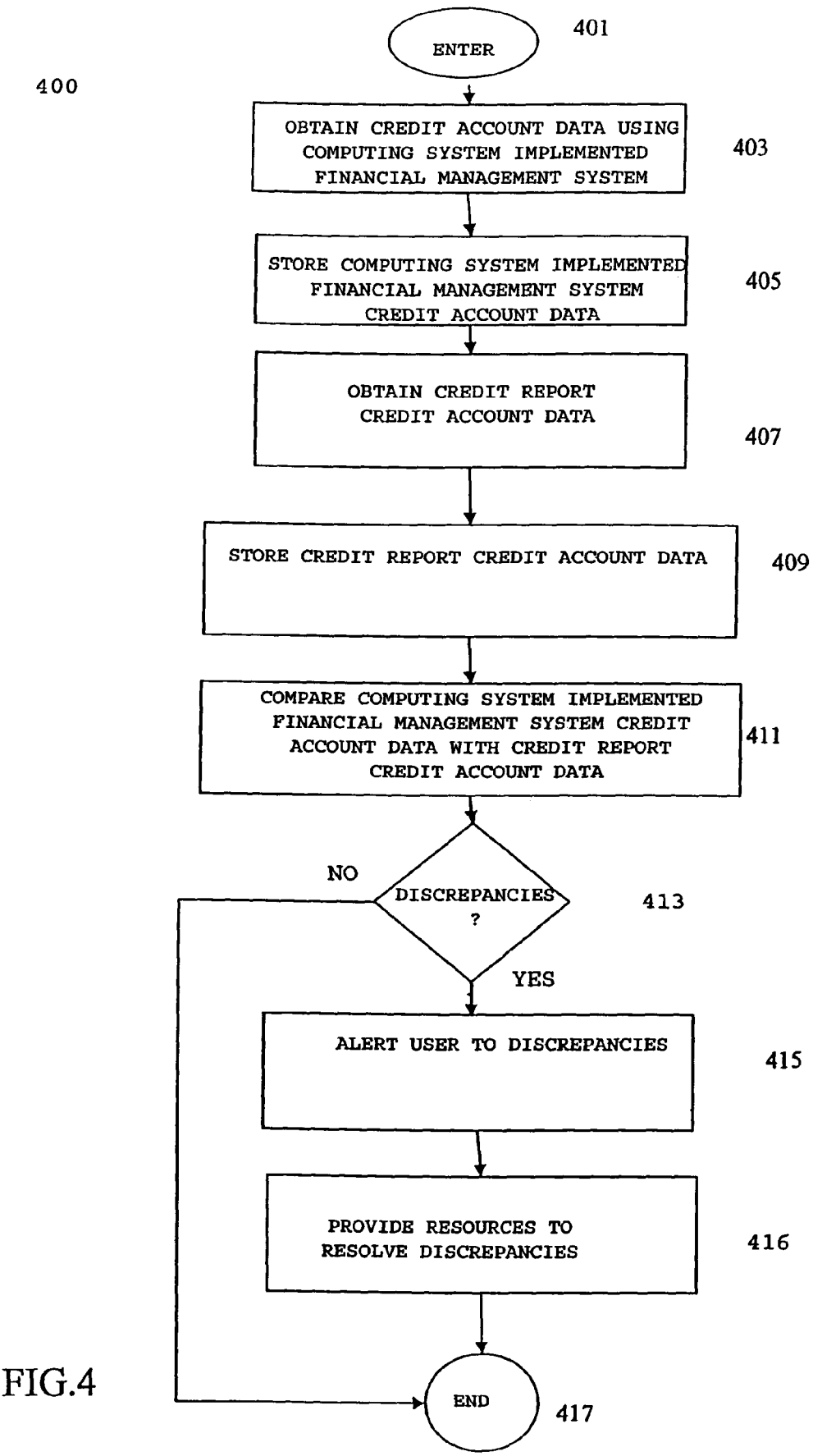
FIG. 4 is a flow chart depicting a process for monitoring credit reports and correcting discrepancies in accordance with one embodiment.

In one embodiment, a credit report (not shown) is then obtained and credit report credit account data (FIG. 3B) representing the various credit account information contained in the credit report is obtained (207 in FIG. 2 and 407 in FIG. 4) and stored (209 in FIG. 2 and 409 in FIG. 4). Then, according to one embodiment, the computing system implemented financial management system credit account data and the credit report credit account data are compared (211 in FIG. 2 and 411 in FIG. 4) and any discrepancies (213 in FIG. 2 and 413 in FIG. 4) between the two credit data sources is brought to the user's attention (215 in FIG. 2 and 415 in FIG. 4) and/or included in a credit discrepancy report (not shown) which is then provided to the user.

In one embodiment, if a discrepancy is found between the credit account data from the computing system implemented financial management system and the credit account data from the credit report with respect to a specific credit account or credit transaction, the user is asked to confirm the discrepancy and is given the opportunity to label the credit account, or transaction, as a suspected incorrect and/or fraud event (416 in FIG. 4).

In one embodiment, once a credit account or specific credit transaction is labeled as a suspected incorrect and/or fraud event, the process for monitoring credit reports disclosed herein directs the user to a website or database where the user is provided instructions and/or forms for challenging a credit account and/or transaction and/or reporting an instance of credit fraud and/or ID theft.

In one embodiment, once a credit account or specific credit transaction is labeled as a suspected incorrect and/or fraud event, the credit account data collected from the computing system implemented financial management system and/or the credit report credit account data is used to fill out forms used to challenge a credit account or transaction and/or report an instance of credit fraud and/or ID theft.

The method and apparatus for monitoring credit reports using a computing system implemented financial management system disclosed herein provides a user/consumer with the ability to use credit data already collected by a computer implemented financial management system to check the accuracy of the user's/consumer's credit report. Consequently, using the method and apparatus for monitoring credit reports using a computing system implemented financial management system disclosed herein, a user/consumer can readily detect mistakes in their credit report and/or fraudulent activity involving the user's/consumer's credit and/or identity. Therefore, the method and apparatus for monitoring credit reports using a computing system implemented financial management system disclosed herein allows the user to receive greater benefit and security from credit reports including the newly legislated free annual credit reports.

As used herein, the term computing system implemented financial management system includes, but is not limited to: computing system implemented business systems, packages, programs, modules, or applications; computing system implemented personal and small business financial management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications known at the time of filling or as developed later.

For illustrative purposes, embodiments are described within the framework of, and using, one or more computing system implemented financial management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system known at the time of filling or as developed later. Some embodiments are implemented in a mobile computing system running mobile operating systems such as Symbian® OS, Windows® Mobile, or any other operating system designed to generally manage operations on a mobile computing system known at the time of filling or as developed later. As described more fully below, embodiments can be implemented on computing systems other than a conventional computing system such as, for example, a personal digital assistant, a cell phone, or other computing system capable of processing computer readable data. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s) known at the time of filling or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the computing system implemented financial management systems described herein make use of input provided to the computer device implementing a process for monitoring credit reports, discussed herein, via user interface devices such as a keyboard, mouse, touchpad, or any other device capable of providing user input to a computing system or for translating user actions into computing system operations known at the time of filling or as developed later.

Hardware System Architecture

FIG. 1 is a block diagram of an exemplary hardware architecture for implementing one embodiment of a method and apparatus for monitoring credit reports, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented financial management systems 180 stored, in whole, or in part, therein, that are used by, or include, as discussed below, a process for monitoring credit reports, such as processes 200 and 400 discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100 known at the time of filing or as later developed. As discussed in more detail below, in one embodiment, a process for monitoring credit reports, such as processes 200 and 400, and a computing system implemented financial management system 180, can be loaded, in whole, or in part, into computing system 100 via I/O device 113, such as from a CD, DVD or floppy disk containing all, or part, of computing system implemented financial management system 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented financial management systems 190 stored, in whole, or in part, therein, that are used by, or include, as discussed below, a process for monitoring credit reports, such as processes 200 and 400.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150 known at the time of filing or as later developed. As discussed in more detail below, in one embodiment, a process for monitoring credit reports, such as processes 200 and 400, and a computing system implemented financial management system 190, can be loaded, in whole, or in part, into computing system 150 via I/O device 163, such as from a CD, DVD or floppy disk containing all, or part, of computing system implemented financial management system 190.

Also shown in FIG. 1 is database 170. In one embodiment, database 170 is a designated server system or computing system, or a designated potion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process for monitoring credit reports, such as processes 200 and 400, and/or computing system implemented financial management system 180 and/or computing system implemented financial management system 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process for monitoring credit reports, such as processes 200 and 400, and a computing system implemented financial management system 180 and/or computing system implemented financial management system 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130 known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for monitoring credit reports, such as processes 200 and 400, and a computing system implemented financial management system 180 and/or computing system implemented financial management system 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for monitoring credit reports, such as processes 200 and 400, and a computing system implemented financial management system, are sometimes referred to herein, alternatively, as a process, an application, a module, a program, a component of a software system, a component of a software package, a component of a parent system, or a feature of a parent system, this terminology is illustrative only. In some embodiments, a process for monitoring credit reports, such as processes 200 and 400, and a computing system implemented financial management system, discussed herein, are capable of being called from an application or the operating system. In one embodiment, an application or program is generally defined to be any executable code. Moreover, those of skill in the art will understand that when it is said that an application or an operation takes some action, the action is the result of executing one or more instructions by a processor, such as processors 101 and 151, or server system processor 121. In one embodiment, execution of a process for monitoring credit reports, such as processes 200 and 400, and a computing system implemented financial management system, discussed herein, by processor 101, processor 151, or server system processor 121, results in the operations of an agent computer process (not shown) and/or a rule computer process (not shown).

In one embodiment, a process for monitoring credit reports, such as processes 200 and 400, and a computing system implemented financial management system, discussed herein, are a computer application or process implemented and/or run and/or stored, in full, or in part, in, or on, a computer program product. Herein, a computer program product comprises a medium configured to store or transport computer readable code known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code known at the time of filing or as later developed. This medium may belong to a computing system, such as computing systems 100 and 150 of FIG. 1, described above. However, the medium also may be removed from the computing system.

For example, all, or part, of a process for monitoring credit reports, such as processes 200 and 400, and a computing system implemented financial management system, discussed herein, may be stored in a memory that is physically located in a location, such as server system memory 123, or database 170, of FIG. 1, different from a computing system, such as computing systems 100 and/or 150 of FIG. 1, utilizing a process for monitoring credit reports, such as processes 200 and 400, and a computing system implemented financial management system. In one embodiment, all, or part, of a process for monitoring credit reports, such as processes 200 and 400, and a computing system implemented financial management system, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server system, such as computing systems 100 and/or 150 and/or server system 120 of FIG. 1, running and/or utilizing and/or storing all, or part, of a process for monitoring credit reports, such as processes 200 and 400, and a computing system implemented financial management system, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process for monitoring credit reports, such as processes 200 and 400, and a computing system implemented financial management system, discussed herein, in accordance with at least one of the embodiments as described herein. Similarly, in another embodiment, a process for monitoring credit reports, such as processes 200 and 400, and a computing system implemented financial management system, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

FIG. 2 is a flow chart depicting a process for monitoring credit reports 200 in accordance with one embodiment. Process for monitoring credit reports 200 begins at ENTER OPERATION 201 and process flow proceeds to OBTAIN CREDIT ACCOUNT DATA USING COMPUTING SYSTEM IMPLEMENTED FINANCIAL MANAGEMENT SYSTEM OPERATION 203.

At OBTAIN CREDIT ACCOUNT DATA USING COMPUTING SYSTEM IMPLEMENTED FINANCIAL MANAGEMENT SYSTEM OPERATION 203 a computing system implemented financial management system, such as computing system implemented financial management system 180 and/or computing system implemented financial management system 190, is used to obtain data representing various credit accounts, and specific credit related transactions, and, in one embodiment, categorize the transactions and/or credit accounts.

As noted above, various computing system implemented financial management systems are available including: computing system implemented personal and small business financial management systems; computing system implemented tax preparation systems; computing system implemented business accounting systems; and computing system implemented medical expense management systems; as well as various other electronic transaction data driven financial management systems.

As noted above, as used herein, the term computing system implemented financial management system includes, but is not limited to: computing system implemented business systems, packages, programs, modules, or applications; computing system implemented personal and small business financial management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications.

As also noted above, computing system implemented financial management systems help users manage their finances by providing a centralized interface with banks, credit card companies, and other various financial institutions, for electronically identifying and categorizing user financial transactions. Computing system implemented financial management systems typically obtain electronic transaction based information, such as payee, payment amount, date, etc. via communication with banks, credit card providers, or other financial institutions, using electronic data transfer systems such as the Open Financial Exchange (OFX) specification, Web Direct, or various systems for transferring financial transaction data.

FIG. 3A shows a representation of an exemplary data format as created for a single credit account by an exemplary computing system implemented financial management system. As shown in FIG. 3A, an exemplary data format as created for a single credit account by an exemplary computing system implemented financial management system includes information such as: Payee, in this specific example, HOMETOWN BANK USA; Payee Address, in this specific example, 1 Main Street, Anytown, AnyState, USA 01234; Account Number, in this specific example, 1234-1234-1234-1234; Payment amount, in this specific example, $100.00; Payment date, in this specific example, May 1, 2006; Payment Frequency, in this specific example, Monthly; and Account Type, in this specific example, Car Loan.

Those of skill in the art will recognize that the format of the data, and the specific types of data, shown in FIG. 3A will vary from computing system implemented financial management system to computing system implemented financial management system, and even between accounts within the same computing system implemented financial management system. Consequently, the specific data shown, and the format of the data shown, in FIG. 3A is exemplary only.

In one embodiment, once the data representing various credit accounts, and specific credit related transactions, is obtained and/or categorized at OBTAIN CREDIT ACCOUNT DATA USING COMPUTING SYSTEM IMPLEMENTED FINANCIAL MANAGEMENT SYSTEM OPERATION 203, Process flow proceeds to STORE COMPUTING SYSTEM IMPLEMENTED FINANCIAL MANAGEMENT SYSTEM CREDIT ACCOUNT DATA OPERATION 205.

At STORE COMPUTING SYSTEM IMPLEMENTED FINANCIAL MANAGEMENT SYSTEM CREDIT ACCOUNT DATA OPERATION 205, the data representing various credit accounts, and specific credit related transactions obtained at OBTAIN CREDIT ACCOUNT DATA USING COMPUTING SYSTEM IMPLEMENTED FINANCIAL MANAGEMENT SYSTEM OPERATION 203 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, the data, in whole, or in part, is stored in any computing device and/or server system, such as computing devices 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a financial institution; the provider of a parent computing system implemented financial management system employing process for monitoring credit reports 200; the provider of process for monitoring credit reports 200; a third party ID theft protection service; or any other parties.

Returning to FIG. 2, in one embodiment, once the data representing various credit accounts, and specific credit related transactions is saved by storing the data at STORE COMPUTING SYSTEM IMPLEMENTED FINANCIAL MANAGEMENT SYSTEM CREDIT ACCOUNT DATA OPERATION 205, process proceeds to OBTAIN CREDIT REPORT CREDIT ACCOUNT DATA OPERATION 207.

At OBTAIN CREDIT REPORT CREDIT ACCOUNT DATA OPERATION 207 credit account data is obtained from a credit report. In one embodiment the credit report data is obtained by process for monitoring credit reports 200 at OBTAIN CREDIT REPORT CREDIT ACCOUNT DATA OPERATION 207 by scanning in a hard copy of the credit report and parsing and/or copying the relevant credit report data from the scanned copy of the credit report by methods well-known to those of us only art. In one embodiment, parsing is accomplished using a C/C++/Java application by methods known to those of skill in the art. In one embodiment, a separate parser application is created for each credit reporting agency, such as Experian, TransUnion, and/or Equifax, to accommodate different data formats.

In one embodiment, the credit report data is obtained by process for monitoring credit reports 200 at OBTAIN CREDIT REPORT CREDIT ACCOUNT DATA OPERATION 207 by uploading a PDF or HMTL copy of the credit report and by parsing and/or copying the relevant credit report data by methods well-known to those of skill in the art. In one embodiment, parsing is accomplished using a C/C++/Java application by methods known to those of skill in the art. In one embodiment, a separate parser application is created for each credit reporting agency, such as Experian, TransUnion, and/or Equifax, to accommodate different data formats.

In one embodiment, the credit report data is obtained by process for monitoring credit reports 200 at OBTAIN CREDIT REPORT CREDIT ACCOUNT DATA OPERATION 207 by manually entering the data into a computing system, such as computing systems 100 and 150 of FIG. 1, implementing process for monitoring credit reports 200 of FIG. 2.

FIG. 3B shows a representation of an exemplary data format for the single credit account of FIG. 3A, discussed above, as might be obtained from an exemplary credit report by an exemplary credit reporting agency. As shown in FIG. 3B, an exemplary data format for the single credit account as might be obtained from an exemplary credit report includes information such as: Account, in this particular example, HOMETOWN BANK USA; Address, in this particular example, 1 Main Street, Anytown, AnyState, USA 01234; Account Number, in this particular example, 1234-1234-1234-1234; Status, in this particular example, Paid/Never late; Date Opened, in this particular example, Jun. 5, 2004; Type, in this particular example, Installment; Reported Since, in this particular example, 06/2004; Term, in this particular example, 24 Months; Date of Status, in this particular example, Jun. 5, 2006; Monthly Payment, in this particular example, $100.00; Last Reported, in this particular example, May 5, 2006; Responsibility, in this particular example, Individual Credit Limit/Car Loan; Original Amount, in this particular example, $2000.00; High Balance, in this particular example, $2000.00; Recent Balance, in this particular example, $200.00; and Recent Payment, in this particular example, $100.00 on May 5, 2006.

Those of skill in the art will recognize that the format of the data, and the specific types of data, shown in FIG. 3B will vary from credit reporting agency to credit reporting agency, and even between accounts within the same credit reporting agency. Consequently, the specific data shown, and the format of the data shown, in FIG. 3B is exemplary only.

In one embodiment, process for monitoring credit reports 200 includes a reminder (not shown) feature that generates a reminder, in the form of a pop-up display or other screen display, e-mail, or other electronic or non-electronic means, to remind the user of process for monitoring credit reports 200 to obtain a recent credit report at user-defined and/or process for monitoring credit reports 200 provider-defined intervals, such as annually for the free credit reports discussed above.

In one embodiment, once the data representing various credit accounts is obtained from a credit report at OBTAIN CREDIT REPORT CREDIT ACCOUNT DATA OPERATION 207, process flow proceeds to STORE CREDIT REPORT CREDIT ACCOUNT DATA OPERATION 209.

At STORE CREDIT REPORT CREDIT ACCOUNT DATA OPERATION 209 the data representing various credit accounts obtained from a credit report at OBTAIN CREDIT REPORT CREDIT ACCOUNT DATA OPERATION 207 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, the data, in whole, or in part, is stored in any computing device and/or server system, such as computing devices 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a financial institution; the provider of a parent computing system implemented financial management system employing process for monitoring credit reports 200; the provider of process for monitoring credit reports 200; a third party ID theft protection service; or any other parties.

In one embodiment, once the data from the credit report representing the various credit accounts is saved at STORE CREDIT REPORT CREDIT ACCOUNT DATA OPERATION 209 process flow proceeds to COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211.

At COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211 process for monitoring credit reports 200 compares the data obtained at OBTAIN CREDIT ACCOUNT DATA USING COMPUTING SYSTEM IMPLEMENTED FINANCIAL MANAGEMENT SYSTEM OPERATION 203 and saved at STORE COMPUTING SYSTEM IMPLEMENTED FINANCIAL MANAGEMENT SYSTEM CREDIT ACCOUNT DATA OPERATION 205 with the data obtained at OBTAIN CREDIT REPORT CREDIT ACCOUNT DATA OPERATION 207 and saved at STORE CREDIT REPORT CREDIT ACCOUNT DATA OPERATION 209. In one embodiment, the data from the two sources of credit account data is searched/compared by any one of various compare means known to those of skill in the art in an attempt to match up the accounts created and categorized by the computing system implemented financial management system with the accounts listed in the credit report.

In one embodiment, matching up the accounts created and categorized by the computing system implemented financial management system with the accounts listed in the credit report is done by comparing the data fields and data in the respective data formats of, as an example, FIGS. 3A and 3B, from the computing system implemented financial management system and the credit report, respectively. For example, in the particular illustration of FIGS. 3A and 3b, matches can be made based on: payee name; payee address; account number; monthly payment; payment date, within a defined range; payment amount; or account type, all of which, in this particular example, are identical in both formats and from both sources.

In one embodiment, an exact match between the two sources of credit account data is not required, but instead a strong enough partial match to enable the computing system implemented financial management system to present the user with a list of potential matches, in one embodiment in the form of a drop-down display window or other display or interface. In one embodiment the list of potential matches also provides the user with the opportunity to create a user-defined match and/or account name. In addition, in one embodiment, a user is provided with the opportunity to designate an account as a potentially fraudulent account and/or fraudulent transaction.

In one embodiment, a user is provided with the opportunity to designate an account or transaction as a valid new account or transaction at COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211. This feature is particularly useful for identifying and sharing new credit account and/or transaction data between the two sources of credit account data; thereby providing the user with an accurate and more automated mechanism for synchronizing the data from the two sources of credit account data.

For instance, as an example, the user may have forgotten, or simply not had time to, enter a recent car payment, or even a new car loan account, into his or her computing system implemented financial management system. However, the recent payment, or new account, may well be shown on the user's credit report. In this example, using process for monitoring credit reports 200, the discrepancy would be discovered at COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211. Then, in one embodiment, the user would be provided the opportunity to declare the credit transaction or account valid and, in one embodiment, the user could further request the account data be transferred from the credit report into the computing system implemented financial management system. Consequently, the data from the two sources of credit account data would be synchronized, with minimal, or no, manual entry or user action. In addition, those of skill in the art will readily recognize that data can be transferred both ways, i.e., from a credit report to a computing system implemented financial management system, as in the example above, or from a computing system implemented financial management system to a credit report.

In one embodiment, once a comparison between the data obtained at OBTAIN CREDIT ACCOUNT DATA USING COMPUTING SYSTEM IMPLEMENTED FINANCIAL MANAGEMENT SYSTEM OPERATION 203 and saved at STORE COMPUTING SYSTEM IMPLEMENTED FINANCIAL MANAGEMENT SYSTEM CREDIT ACCOUNT DATA OPERATION 205 with the data obtained at OBTAIN CREDIT REPORT CREDIT ACCOUNT DATA OPERATION 207 and saved at STORE CREDIT REPORT CREDIT ACCOUNT DATA OPERATION 209 is made at COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211, process flow proceeds to DISCREPANCIES ? OPERATION 213.

At DISCREPANCIES ? OPERATION 213 a determination is made as to whether there are any discrepancies between the credit account data obtained at OBTAIN CREDIT ACCOUNT DATA USING COMPUTING SYSTEM IMPLEMENTED FINANCIAL MANAGEMENT SYSTEM OPERATION 203 and saved at STORE COMPUTING SYSTEM IMPLEMENTED FINANCIAL MANAGEMENT SYSTEM CREDIT ACCOUNT DATA OPERATION 205 and the credit account data obtained at OBTAIN CREDIT REPORT CREDIT ACCOUNT DATA OPERATION 207 and saved at STORE CREDIT REPORT CREDIT ACCOUNT DATA OPERATION 209. If it is determined at DISCREPANCIES ? OPERATION 213 that there are no discrepancies between the credit account data obtained at OBTAIN CREDIT ACCOUNT DATA USING COMPUTING SYSTEM IMPLEMENTED FINANCIAL MANAGEMENT SYSTEM OPERATION 203 and saved at STORE COMPUTING SYSTEM IMPLEMENTED FINANCIAL MANAGEMENT SYSTEM CREDIT ACCOUNT DATA OPERATION 205 and the credit account data obtained at OBTAIN CREDIT REPORT CREDIT ACCOUNT DATA OPERATION 207 and saved at STORE CREDIT REPORT CREDIT ACCOUNT DATA OPERATION 209, process flow proceeds to END OPERATION 217 and process for monitoring credit reports 200 is exited. However, in one embodiment, the data obtained at OBTAIN CREDIT ACCOUNT DATA USING COMPUTING SYSTEM IMPLEMENTED FINANCIAL MANAGEMENT SYSTEM OPERATION 203 and saved at STORE COMPUTING SYSTEM IMPLEMENTED FINANCIAL MANAGEMENT SYSTEM CREDIT ACCOUNT DATA OPERATION 205 and the data obtained at OBTAIN CREDIT REPORT CREDIT ACCOUNT DATA OPERATION 207 and saved at STORE CREDIT REPORT CREDIT ACCOUNT DATA OPERATION 209 is saved, as is any discrepancy resolution data from COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211, for use with future credit reports and credit reports from other credit reporting agencies.

If on the other hand, it is determined at DISCREPANCIES ? OPERATION 213 that there are discrepancies between the credit account data obtained at OBTAIN CREDIT ACCOUNT DATA USING COMPUTING SYSTEM IMPLEMENTED FINANCIAL MANAGEMENT SYSTEM OPERATION 203 and saved at STORE COMPUTING SYSTEM IMPLEMENTED FINANCIAL MANAGEMENT SYSTEM CREDIT ACCOUNT DATA OPERATION 205 and the credit account data obtained at OBTAIN CREDIT REPORT CREDIT ACCOUNT DATA OPERATION 207 and saved at STORE CREDIT REPORT CREDIT ACCOUNT DATA OPERATION 209, process flow proceeds to ALERT USER TO DISCREPANCIES OPERATION 215.

At ALERT USER TO DISCREPANCIES OPERATION 215, any credit accounts or credit account transactions having unresolved discrepancies from COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211 are considered suspect credit accounts and/or transactions and are brought to the user's attention via any one of numerous mechanisms including: a pop-up window listing the suspect credit accounts and/or transactions; the generation and display of a credit account discrepancy report; an e-mail alert; a telephone alert; or any other electronic or non-electronic alert system whereby a user of process for monitoring credit reports can be informed and/or alerted of the suspect credit accounts and/or transactions as known at the time of filing and as developed later. In one embodiment, the financial institutions maintaining the suspect accounts are also alerted.

In one embodiment, the alert generated at ALERT USER TO DISCREPANCIES OPERATION 215 for the user and/or the financial institutions is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment communication is facilitated using analog modems, digital modems, network interface cards, broadband connections, or any other means for communicably coupling computing systems known at the time of filing or as later developed. In one embodiment, an alert is generated and distributed via phone lines, phone signals or any other form of electronic audio/video/text or alert messaging and/or communication known at the time of filing or as later developed.

In one embodiment, once the alert is generated at ALERT USER TO DISCREPANCIES OPERATION 215 for the user and/or the financial institutions, process flow proceeds to END OPERATION 217 and process for monitoring credit reports 200 is exited. However, in one embodiment, the data obtained at OBTAIN CREDIT ACCOUNT DATA USING COMPUTING SYSTEM IMPLEMENTED FINANCIAL MANAGEMENT SYSTEM OPERATION 203 and saved at STORE COMPUTING SYSTEM IMPLEMENTED FINANCIAL MANAGEMENT SYSTEM CREDIT ACCOUNT DATA OPERATION 205 and the data obtained at OBTAIN CREDIT REPORT CREDIT ACCOUNT DATA OPERATION 207 and saved at STORE CREDIT REPORT CREDIT ACCOUNT DATA OPERATION 209 is saved, as is any discrepancy resolution data from COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211, for use with future credit reports and credit reports from other credit reporting agencies.

In one embodiment, once a credit account or specific credit transaction is labeled as a suspected incorrect and/or fraud event, one embodiment of a process for monitoring credit reports disclosed herein helps the user challenge a credit account and/or transaction and/or report an instance of credit fraud and/or ID theft.

FIG. 4 is a flow chart depicting a process for monitoring credit reports 400 in accordance with one embodiment. Process for monitoring credit reports 400 begins at ENTER OPERATION 401 and process flow proceeds to OBTAIN CREDIT ACCOUNT DATA USING COMPUTING SYSTEM IMPLEMENTED FINANCIAL MANAGEMENT SYSTEM OPERATION 403.

OBTAIN CREDIT ACCOUNT DATA USING COMPUTING SYSTEM IMPLEMENTED FINANCIAL MANAGEMENT SYSTEM OPERATION 403 is substantially similar to OBTAIN CREDIT ACCOUNT DATA USING COMPUTING SYSTEM IMPLEMENTED FINANCIAL MANAGEMENT SYSTEM OPERATION 203 of FIG. 2 discussed above, and the discussion above with respect to OBTAIN CREDIT ACCOUNT DATA USING COMPUTING SYSTEM IMPLEMENTED FINANCIAL MANAGEMENT SYSTEM OPERATION 203 of FIG. 2 applies to, and is incorporated here, for OBTAIN CREDIT ACCOUNT DATA USING COMPUTING SYSTEM IMPLEMENTED FINANCIAL MANAGEMENT SYSTEM OPERATION 403 of FIG. 4. In particular, at OBTAIN CREDIT ACCOUNT DATA USING COMPUTING SYSTEM IMPLEMENTED FINANCIAL MANAGEMENT SYSTEM OPERATION 403 a computing system implemented financial management system, such as computing system implemented financial management system 180 and/or computing system implemented financial management system 190, is used to obtain data representing various credit accounts, and specific credit related transactions, and, in one embodiment, categorize the transactions and/or credit accounts as described above.

In one embodiment, once the data representing various credit accounts, and specific credit related transactions, is obtained and/or categorized at OBTAIN CREDIT ACCOUNT DATA USING COMPUTING SYSTEM IMPLEMENTED FINANCIAL MANAGEMENT SYSTEM OPERATION 403, Process flow proceeds to STORE COMPUTING SYSTEM IMPLEMENTED FINANCIAL MANAGEMENT SYSTEM CREDIT ACCOUNT DATA OPERATION 405.

STORE COMPUTING SYSTEM IMPLEMENTED FINANCIAL MANAGEMENT SYSTEM CREDIT ACCOUNT DATA OPERATION 405 is substantially similar to STORE COMPUTING SYSTEM IMPLEMENTED FINANCIAL MANAGEMENT SYSTEM CREDIT ACCOUNT DATA OPERATION 205 of FIG. 2 discussed above, and the discussion above with respect to STORE COMPUTING SYSTEM IMPLEMENTED FINANCIAL MANAGEMENT SYSTEM CREDIT ACCOUNT DATA OPERATION 205 of FIG. 2 applies to, and is incorporated here, for STORE COMPUTING SYSTEM IMPLEMENTED FINANCIAL MANAGEMENT SYSTEM CREDIT ACCOUNT DATA OPERATION 405 of FIG. 4. In particular, at STORE COMPUTING SYSTEM IMPLEMENTED FINANCIAL MANAGEMENT SYSTEM CREDIT ACCOUNT DATA OPERATION the data representing various credit accounts, and specific credit related transactions is saved by storing the data by any one of the many means known in the art and/or as described above.

In one embodiment, once the data representing various credit accounts, and specific credit related transactions, is saved by storing the data at STORE COMPUTING SYSTEM IMPLEMENTED FINANCIAL MANAGEMENT SYSTEM CREDIT ACCOUNT DATA OPERATION 405, process proceeds to OBTAIN CREDIT REPORT CREDIT ACCOUNT DATA OPERATION 407.

OBTAIN CREDIT REPORT CREDIT ACCOUNT DATA OPERATION 407 is substantially similar to OBTAIN CREDIT REPORT CREDIT ACCOUNT DATA OPERATION 207 of FIG. 2 discussed above, and the discussion above with respect to OBTAIN CREDIT REPORT CREDIT ACCOUNT DATA OPERATION 207 of FIG. 2 applies to, and is incorporated here, for OBTAIN CREDIT REPORT CREDIT ACCOUNT DATA OPERATION 407 of FIG. 4. In particular, at OBTAIN CREDIT REPORT CREDIT ACCOUNT DATA OPERATION 407 credit account data is obtained from a credit report by any of the means discussed above.

In one embodiment, process for monitoring credit reports 400 includes a reminder (not shown), in the form of a pop-up display or other screen display, e-mail, or other electronic or non-electronic means, to remind the user of process for monitoring credit reports 400 to obtain a recent credit report at user-defined and/or process for monitoring credit reports 400 provider-defined intervals, such as annually for the free credit reports discussed above.

In one embodiment, once the data representing various credit accounts is obtained from a credit report at OBTAIN CREDIT REPORT CREDIT ACCOUNT DATA OPERATION 407, process flow proceeds to STORE CREDIT REPORT CREDIT ACCOUNT DATA OPERATION 409.

STORE CREDIT REPORT CREDIT ACCOUNT DATA OPERATION 409 is substantially similar to STORE CREDIT REPORT CREDIT ACCOUNT DATA OPERATION 209 of FIG. 2 discussed above, and the discussion above with respect to STORE CREDIT REPORT CREDIT ACCOUNT DATA OPERATION 209 of FIG. 2 applies to, and is incorporated here, for STORE CREDIT REPORT CREDIT ACCOUNT DATA OPERATION 409 of FIG. 4. In particular, at STORE CREDIT REPORT CREDIT ACCOUNT DATA OPERATION 409 the data representing various credit accounts obtained from a credit report at OBTAIN CREDIT REPORT CREDIT ACCOUNT DATA OPERATION 407 is saved by storing the data, in whole, or in part, by any one of the numerous mechanisms known to those of skill in the art and/or discussed above.

In one embodiment, once the data from the credit report representing the various credit accounts is saved at STORE CREDIT REPORT CREDIT ACCOUNT DATA OPERATION 409 process flow proceeds to COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 411.

COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 411 is substantially similar to COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211 of FIG. 2 discussed above, and the discussion above with respect to COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 211 of FIG. 2 applies to, and is incorporated here, for COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 411 of FIG. 4. In particular, at COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 411 process for monitoring credit reports 400 compares the data obtained at OBTAIN CREDIT ACCOUNT DATA USING COMPUTING SYSTEM IMPLEMENTED FINANCIAL MANAGEMENT SYSTEM OPERATION 403 and saved at STORE COMPUTING SYSTEM IMPLEMENTED FINANCIAL MANAGEMENT SYSTEM CREDIT ACCOUNT DATA OPERATION 405 with the data obtained at OBTAIN CREDIT REPORT CREDIT ACCOUNT DATA OPERATION 407 and saved at STORE CREDIT REPORT CREDIT ACCOUNT DATA OPERATION 409. In one embodiment, the credit account data from the two sources of credit account data is searched in attempt to match up the accounts created and categorized by the computing system implemented financial management system with the accounts listed in the credit report as described above.

In one embodiment, once a comparison between the data obtained at OBTAIN CREDIT ACCOUNT DATA USING COMPUTING SYSTEM IMPLEMENTED FINANCIAL MANAGEMENT SYSTEM OPERATION 403 and saved at STORE COMPUTING SYSTEM IMPLEMENTED FINANCIAL MANAGEMENT SYSTEM CREDIT ACCOUNT DATA OPERATION 405 with the data obtained at OBTAIN CREDIT REPORT CREDIT ACCOUNT DATA OPERATION 407 and saved at STORE CREDIT REPORT CREDIT ACCOUNT DATA OPERATION 409 is made at COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 411, process flow proceeds to DISCREPANCIES ? OPERATION 413.

At DISCREPANCIES ? OPERATION 413 a determination is made as to whether there are any discrepancies between the credit account data obtained at OBTAIN CREDIT ACCOUNT DATA USING COMPUTING SYSTEM IMPLEMENTED FINANCIAL MANAGEMENT SYSTEM OPERATION 403 and saved at STORE COMPUTING SYSTEM IMPLEMENTED FINANCIAL MANAGEMENT SYSTEM CREDIT ACCOUNT DATA OPERATION 405 and the credit account data obtained at OBTAIN CREDIT REPORT CREDIT ACCOUNT DATA OPERATION 407 and saved at STORE CREDIT REPORT CREDIT ACCOUNT DATA OPERATION 409. If it is determined at DISCREPANCIES ? OPERATION 413 that there are no discrepancies between the credit account data obtained at OBTAIN CREDIT ACCOUNT DATA USING COMPUTING SYSTEM IMPLEMENTED FINANCIAL MANAGEMENT SYSTEM OPERATION 403 and saved at STORE COMPUTING SYSTEM IMPLEMENTED FINANCIAL MANAGEMENT SYSTEM CREDIT ACCOUNT DATA OPERATION 405 and the credit account data obtained at OBTAIN CREDIT REPORT CREDIT ACCOUNT DATA OPERATION 407 and saved at STORE CREDIT REPORT CREDIT ACCOUNT DATA OPERATION 409, process flow proceeds to END OPERATION 417 and process for monitoring credit reports 400 is exited. However, in one embodiment, the data obtained at OBTAIN CREDIT ACCOUNT DATA USING COMPUTING SYSTEM IMPLEMENTED FINANCIAL MANAGEMENT SYSTEM OPERATION 403 and saved at STORE COMPUTING SYSTEM IMPLEMENTED FINANCIAL MANAGEMENT SYSTEM CREDIT ACCOUNT DATA OPERATION 405 and the data obtained at OBTAIN CREDIT REPORT CREDIT ACCOUNT DATA OPERATION 407 and saved at STORE CREDIT REPORT CREDIT ACCOUNT DATA OPERATION 409 is saved, as is any discrepancy resolution data from COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 411, for use with future credit reports and credit reports from other credit reporting agencies.

If on the other hand, it is determined at DISCREPANCIES ? OPERATION 413 that there are discrepancies between the credit account data obtained at OBTAIN CREDIT ACCOUNT DATA USING COMPUTING SYSTEM IMPLEMENTED FINANCIAL MANAGEMENT SYSTEM OPERATION 403 and saved at STORE COMPUTING SYSTEM IMPLEMENTED FINANCIAL MANAGEMENT SYSTEM CREDIT ACCOUNT DATA OPERATION 405 and the credit account data obtained at OBTAIN CREDIT REPORT CREDIT ACCOUNT DATA OPERATION 407 and saved at STORE CREDIT REPORT CREDIT ACCOUNT DATA OPERATION 409, process flow proceeds to ALERT USER TO DISCREPANCIES OPERATION 415.

At ALERT USER TO DISCREPANCIES OPERATION 415, any credit accounts having unresolved discrepancies from COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 411 are considered suspect credit accounts and are brought to the user's attention via any one of numerous mechanisms including: a pop-up window listing the suspect credit accounts; the generation and display of a credit account discrepancy report; an e-mail alert; a telephone alert; or any other electronic or non-electronic alert system whereby a user of process for monitoring credit reports can be informed and/or alerted of the suspect credit accounts known at the time of filing or as later developed. In one embodiment, the financial institutions maintaining the suspect accounts are also alerted.

In one embodiment, the alert generated at ALERT USER TO DISCREPANCIES OPERATION 415 for the user and/or the financial institutions is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems known at the time of filing or as later developed. In one embodiment communication is facilitated using analog modems, digital modems, network interface cards, broadband connections, or any other means for communicably coupling computing systems known at the time of filing or as later developed. In one embodiment, the alert is generated and distributed via phone lines, phone signals or any other form of electronic audio/video/text or alert messaging and/or communication known at the time of filing or as later developed.

In one embodiment, once the alert is generated at ALERT USER TO DISCREPANCIES OPERATION 415 for the user and/or the financial institutions, the user is asked to confirm the discrepancy and is given the opportunity to label the credit account, or activity, as a suspected incorrect and/or fraud event. In one embodiment, once the alert is generated and the user is given the opportunity to label the credit account, or activity, as a suspected incorrect and/or fraud event at ALERT USER TO DISCREPANCIES OPERATION 415, process flow proceeds to PROVIDE RESOURCES TO RESOLVE DISCREPANCIES OPERATION 416.

In one embodiment, at PROVIDE RESOURCES TO RESOLVE DISCREPANCIES OPERATION 416, once a credit account, or specific credit transaction, is labeled as a suspected incorrect and/or fraud event, process for monitoring credit reports 400 directs the user to a website or database, as defined below, where the user is provided instructions and/or forms for challenging a credit account and/or transaction and/or report an instance of credit fraud and/or ID theft.

In one embodiment, the data representing instructions and/or forms for challenging a credit account and/or transaction and/or report an instance of credit fraud and/or ID theft used in PROVIDE RESOURCES TO RESOLVE DISCREPANCIES OPERATION 416 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, the data, in whole, or in part, is stored in any computing device and/or server system, such as computing devices 100, 151, or server system 120, or other device, in another location, or on/in computer readable medium, and/or any other computer program product, as defined herein. In one embodiment, the data, in whole, or in part, is stored on a webpage or in a web-based system.

Returning to FIG. 4, in some embodiments, the means for storing the data described above are maintained, in whole, or in part, by: the user, or a user computing system; a financial institution; the provider of a parent computing system implemented financial management system employing process for monitoring credit reports 400; the provider of process for monitoring credit reports 400; a third party ID theft protection service; or any other parties.

In one embodiment at PROVIDE RESOURCES TO RESOLVE DISCREPANCIES OPERATION 416, once a credit account or specific credit transaction is labeled as a suspected incorrect and/or fraud event, the credit data collected from the computing system implemented financial management system and/or the credit report credit account data is used to fill out forms used to challenge a credit account or transaction and/or report an instance of credit fraud and/or ID theft.

From PROVIDE RESOURCES TO RESOLVE DISCREPANCIES OPERATION 416 process flow proceeds to END OPERATION 417 and process for monitoring credit reports 400 is exited. However, in one embodiment, the data obtained at OBTAIN CREDIT ACCOUNT DATA USING COMPUTING SYSTEM IMPLEMENTED FINANCIAL MANAGEMENT SYSTEM OPERATION 403 and saved at STORE COMPUTING SYSTEM IMPLEMENTED FINANCIAL MANAGEMENT SYSTEM CREDIT ACCOUNT DATA OPERATION 405 and the data obtained at OBTAIN CREDIT REPORT CREDIT ACCOUNT DATA OPERATION 407 and saved at STORE CREDIT REPORT CREDIT ACCOUNT DATA OPERATION 409 is saved, as is any discrepancy resolution data from COMPARE COMPUTING SYSTEM IMPLEMENTED FINANCIAL MANAGEMENT SYSTEM CREDIT ACCOUNT DATA WITH CREDIT REPORT CREDIT ACCOUNT DATA OPERATION 411, for use with future credit reports and credit reports from other credit reporting agencies.

The method and apparatus for monitoring credit reports using a computing system implemented financial management system disclosed herein provides a user/consumer with the ability to use data collected by a computer implemented financial management system to check the accuracy of the user's/consumer's credit report. Consequently, using the method and apparatus for monitoring credit reports using a computing system implemented financial management system disclosed herein, a user/consumer can readily detect mistakes in their credit report and/or fraudulent activity involving the user's/consumer's credit and/or identity. Therefore, The method and apparatus for monitoring credit reports using a computing system implemented financial management system disclosed herein allows the user to receive greater benefit and security from credit reports including the newly legislated free annual credit reports.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant.

Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "storing", "categorizing", "comparing", "implementing", "alerting", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process for monitoring credit reports, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for monitoring credit reports comprising:

obtaining electronic transaction data associated with a given user from two or more sources of electronic transaction data using a computing system implemented financial management system, the electronic transaction data including electronic transaction data associated with at least one credit account and electronic transaction data associated with at least one account other than a credit account, the computing system implemented financial management system having the capability to categorize the electronic transaction data as income or expense electronic transaction data and to associate the electronic transaction data with one or more events;

storing the electronic transaction data obtained using the computing system implemented financial management system;

obtaining credit report credit account data for the at least one credit account from a credit report;

storing the credit report credit account data;

analyzing the electronic transaction data associated with the at least one credit account obtained using the computing system implemented financial management system and the credit report credit account data for the at least one credit account;

detecting a transaction discrepancy between the electronic transaction data associated with the at least one credit account obtained using the computing system implemented financial management system and the credit report credit account data for the at least one credit account;

alerting the given user of the computing system implemented process for monitoring credit reports of the transaction discrepancy between the electronic transaction data associated with the at least one credit account obtained using the computing system implemented financial management system and the credit report credit account data for the at least one credit account; and alerting a financial institution maintaining the at least one credit account of the transaction discrepancy between the electronic transaction data associated with the at least one credit account obtained using the computing system implemented financial management system and the credit report credit account data for the at least one credit account.

2. The computing system implemented process for monitoring credit reports of claim 1, wherein:

the computing system implemented financial management system is a computing system implemented personal financial management system.

3. The computing system implemented process for monitoring credit reports of claim 1, wherein:

alerting the given user of the computing system implemented process for monitoring credit reports of the transaction discrepancy between the electronic transaction data associated with the at least one credit account obtained using the computing system implemented financial management system and the credit report credit account data for the at least one credit account comprises generating a discrepancy report and providing the discrepancy report to the given user of the computing system implemented process for monitoring credit reports.

4. The computing system implemented process for monitoring credit reports of claim 1, further comprising:

providing the given user access to one or more resources to resolve the transaction discrepancy between the electronic transaction data associated with the at least one credit account obtained using the computing system implemented financial management system and the credit report credit account data for the at least one credit account.

5. The computing system implemented process for monitoring credit reports of claim 4, wherein:

providing the given user access to one or more resources to resolve the transaction discrepancy between the electronic transaction data associated with the at least one credit account obtained using the computing system implemented financial management system and the credit report credit account data for the at least one credit account comprises providing the given user of the computing system implemented process for monitoring credit reports access to instructions for resolving the transaction discrepancy.

6. The computing system implemented process for monitoring credit reports of claim 4, wherein:

providing the given user access to one or more resources to resolve the transaction discrepancy between the electronic transaction data associated with the at least one credit account obtained using the computing system implemented financial management system and the credit report credit account data for the at least one credit account comprises providing the given user of the computing system implemented process for monitoring credit reports access to one or more forms required for resolving the transaction discrepancy.

7. A computing system implemented process for monitoring credit reports comprising:

obtaining electronic account data associated with a given user from two or more sources of electronic account data using a computing system implemented financial management system, the electronic account data including electronic account data associated with at least one credit account associated with the given user and electronic account data associated with at least one account other than a credit account associated with the given user, the computing system implemented financial management system having the capability to categorize electronic transaction data as income or expense electronic transaction data and to associate the electronic transaction data with one or more events;

storing the electronic account data obtained using the computing system implemented financial management system;

obtaining credit report credit account data for at least one credit account associated with the given user from a credit report;

storing the credit report credit account data;

analyzing the electronic account data associated with at least one credit account associated with the given user obtained using the computing system implemented financial management system and the credit report credit account data for at least one credit account associated with the given user;

detecting an account discrepancy between the electronic account data associated with at least one credit account associated with the given user obtained using the computing system implemented financial management system and the credit report credit account data for at least one credit account associated with the given user;

alerting the given user of the computing system implemented process for monitoring credit reports of the account discrepancy between the electronic account data associated with at least one credit account associated with the given user obtained using the computing system implemented financial management system and the credit report credit account data for at least one credit account associated with the given user; and alerting at least one financial institution maintaining at least one credit account associated with the given user of the account discrepancy between the electronic account data associated with at least one credit account associated with the given user obtained using the computing system implemented financial management system and the credit report credit account data for at least one credit account associated with the given user.

8. The computing system implemented process for monitoring credit reports of claim 7, wherein:

the computing system implemented financial management system is a computing system implemented personal financial management system.

9. The computing system implemented process for monitoring credit reports of claim 7, wherein:

alerting the given user of the computing system implemented process for monitoring credit reports of the account discrepancy between the electronic account data associated with at least one credit account associated with the given user obtained using the computing system implemented financial management system and the credit report credit account data for at least one credit account associated with the given user comprises generating a discrepancy report and providing the discrepancy report to the given user of the computing system implemented process for monitoring credit reports.

10. The computing system implemented process for monitoring credit reports of claim 7, further comprising:

providing the given user access to one or more resources to resolve the account discrepancy between the electronic account data associated with at least one credit account associated with the given user obtained using the computing system implemented financial management system and the credit report credit account data for at least one credit account associated with the given user.

11. The computing system implemented process for monitoring credit reports of claim 10, wherein:

providing the given user access to one or more resources to resolve the account discrepancy between the electronic account data associated with at least one credit account associated with the given user obtained using the computing system implemented financial management system and the credit report credit account data for at least one credit account associated with the given user comprises providing the given user of the computing system implemented process for monitoring credit reports access to instructions for resolving the account discrepancy.

12. The computing system implemented process for monitoring credit reports of claim 10, wherein:
providing the given user access to one or more resources to resolve the account discrepancy between the electronic account data associated with at least one credit account associated with the given user obtained using the computing system implemented financial management system and the credit report credit account data for at least one credit account associated with the given user comprises providing the given user of the computing system implemented process for monitoring credit reports access to one or more forms required for resolving the account discrepancy.

13. A system for monitoring credit reports comprising:
a computing system; and
a processor executing at least part of a process for monitoring credit reports, the process for monitoring credit reports comprising:
obtaining electronic transaction data associated with a given user from two or more sources of electronic transaction data using a computing system implemented financial management system, the electronic transaction data including electronic transaction data associated with at least one credit account and electronic transaction data associated with at least one account other than a credit account, the computing system implemented financial management system having the capability to categorize the electronic transaction data as income or expense electronic transaction data and to associate the electronic transaction data with one or more events;
storing the electronic transaction data obtained using the computing system implemented financial management system;
obtaining credit report credit account data for the at least one credit account from a credit report;
storing the credit report credit account data;
analyzing the electronic transaction data associated with the at least one credit account obtained using the computing system implemented financial management system and the credit report credit account data for the at least one credit account;
detecting a transaction discrepancy between the electronic transaction data associated with the at least one credit account obtained using the computing system implemented financial management system and the credit report credit account data for the at least one credit account;
alerting the given user of the computing system implemented process for monitoring credit reports of the transaction discrepancy between the electronic transaction data associated with the at least one credit account obtained using the computing system implemented financial management system and the credit report credit account data for the at least one credit account; and
alerting a financial institution maintaining the at least one credit account of the transaction discrepancy between the electronic transaction data associated with the at least one credit account obtained using the computing system implemented financial management system and the credit report credit account data for the at least one credit account.

14. The system for monitoring credit reports of claim 13, wherein:
the computing system implemented financial management system is a computing system implemented personal financial management system.

15. The system for monitoring credit reports of claim 13, wherein:
alerting the given user of the computing system implemented process for monitoring credit reports of the transaction discrepancy between the electronic transaction data associated with the at least one credit account obtained using the computing system implemented financial management system and the credit report credit account data for the at least one credit account comprises generating a discrepancy report and providing the discrepancy report to the given user of the computing system implemented process for monitoring credit reports.

16. The system for monitoring credit reports of claim 13, further comprising:
providing the given user access to one or more resources to resolve the transaction discrepancy between the electronic transaction data associated with the at least one credit account obtained using the computing system implemented financial management system and the credit report credit account data for the at least one credit account.

17. The system for monitoring credit reports of claim 16, wherein:
providing the given user access to one or more resources to resolve the transaction discrepancy between the electronic transaction data associated with the at least one credit account obtained using the computing system implemented financial management system and the credit report credit account data for the at least one credit account comprises providing the given user of the computing system implemented process for monitoring credit reports access to instructions for resolving the transaction discrepancy.

18. The system for monitoring credit reports of claim 16, wherein:
providing the given user access to one or more resources to resolve the transaction discrepancy between the electronic transaction data associated with the at least one credit account obtained using the computing system implemented financial management system and the credit report credit account data for the at least one credit account comprises providing the given user of the computing system implemented process for monitoring credit reports access to one or more forms required for resolving the transaction discrepancy.

19. A system for monitoring credit reports comprising:
a computing system; and
a processor executing at least part of a process for monitoring credit reports, the process for monitoring credit reports comprising:
obtaining electronic account data associated with a given user from two or more sources of electronic account data using a computing system implemented financial management system, the electronic account data including electronic account data associated with at least one credit account associated with the given user and electronic account data associated with at least one account other than a credit account associated with the given user, the computing system implemented financial management system having the capability to categorize electronic transaction data as income or expense electronic transaction data and to associate the electronic transaction data with one or more events;

storing the electronic account data obtained using the computing system implemented financial management system;

obtaining credit report credit account data for at least one credit account associated with the given user from a credit report;

storing the credit report credit account data;

analyzing the electronic account data associated with at least one credit account associated with the given user obtained using the computing system implemented financial management system and the credit report credit account data for at least one credit account associated with the given user;

detecting an account discrepancy between the electronic account data associated with at least one credit account associated with the given user obtained using the computing system implemented financial management system and the credit report credit account data for at least one credit account associated with the given user;

alerting the given user of the computing system implemented process for monitoring credit reports of the account discrepancy between the electronic account data associated with at least one credit account associated with the given user obtained using the computing system implemented financial management system and the credit report credit account data for at least one credit account associated with the given user; and alerting at least one financial institution maintaining at least one credit account associated with the given user of the account discrepancy between the electronic account data associated with at least one credit account associated with the given user obtained using the computing system implemented financial management system and the credit report credit account data for at least one credit account associated with the given user.

20. The system for monitoring credit reports of claim 19, wherein:

the computing system implemented financial management system is a computing system implemented personal financial management system.

21. The system for monitoring credit reports of claim 19, wherein:

alerting the given user of the computing system implemented process for monitoring credit reports of the account discrepancy between the electronic account data associated with at least one credit account associated with the given user obtained using the computing system implemented financial management system and the credit report credit account data for at least one credit account associated with the given user comprises generating a discrepancy report and providing the discrepancy report to the given user of the computing system implemented process for monitoring credit reports.

22. The system for monitoring credit reports of claim 19, further comprising:

providing the given user access to one or more resources to resolve the account discrepancy between the electronic account data associated with at least one credit account associated with the given user obtained using the computing system implemented financial management system and the credit report credit account data for at least one credit account associated with the given user.

23. The system for monitoring credit reports of claim 22, wherein:

providing the given user access to one or more resources to resolve the account discrepancy between the electronic account data associated with at least one credit account associated with the given user obtained using the computing system implemented financial management system and the credit report credit account data for at least one credit account associated with the given user comprises providing the given user of the computing system implemented process for monitoring credit reports access to instructions for resolving the account discrepancy.

24. The system for monitoring credit reports of claim 22, wherein:

providing the given user access to one or more resources to resolve the account discrepancy between the electronic account data associated with at least one credit account associated with the given user obtained using the computing system implemented financial management system and the credit report credit account data for at least one credit account associated with the given user comprises providing the given user of the computing system implemented process for monitoring credit reports access to one or more forms required for resolving the account discrepancy.

25. A computer program product for monitoring credit reports comprising:

a computer readable medium;

and computer program code, encoded on the computer readable medium, comprising computer readable instructions executed on a processor for:

obtaining electronic transaction data associated with a given user from two or more sources of electronic transaction data using a computing system implemented financial management system, the electronic transaction data including electronic transaction data associated with at least one credit account and electronic transaction data associated with at least one account other than a credit account, the computing system implemented financial management system having the capability to categorize the electronic transaction data as income or expense electronic transaction data and to associate the electronic transaction data with one or more events;

storing the electronic transaction data obtained using the computing system implemented financial management system;

obtaining credit report credit account data for the at least one credit account from a credit report;

storing the credit report credit account data;

analyzing the electronic transaction data associated with the at least one credit account obtained using the computing system implemented financial management system and the credit report credit account data for the at least one credit account;

detecting a transaction discrepancy between the electronic transaction data associated with the at least one credit account obtained using the computing system implemented financial management system and the credit report credit account data for the at least one credit account;

alerting the given user of the computing system implemented process for monitoring credit reports of the transaction discrepancy between the electronic transaction data associated with the at least one credit account obtained using the computing system implemented financial management system and the credit report credit account data for the at least one credit account; and alerting a financial institution maintaining the at least one credit account of the transaction discrepancy between the electronic transaction data associated with the at least one credit account obtained using the computing system implemented financial management system and the credit report credit account data for the at least one credit account.

26. The computer program product for monitoring credit reports of claim 25, wherein:

the computing system implemented financial management system is a computing system implemented personal financial management system.

27. The computer program product for monitoring credit reports of claim 25, wherein:

alerting the given user of the computing system implemented process for monitoring credit reports of the transaction discrepancy between the electronic transaction data associated with the at least one credit account obtained using the computing system implemented financial management system and the credit report credit account data for the at least one credit account comprises generating a discrepancy report and providing the discrepancy report to the given user of the computing system implemented process for monitoring credit reports.

28. The computer program product for monitoring credit reports of claim 25, further comprising:

providing the given user access to one or more resources to resolve the transaction discrepancy between the electronic transaction data associated with the at least one credit account obtained using the computing system implemented financial management system and the credit report credit account data for the at least one credit account.

29. The computer program product for monitoring credit reports of claim 28, wherein:

providing the given user access to one or more resources to resolve the transaction discrepancy between the electronic transaction data associated with the at least one credit account obtained using the computing system implemented financial management system and the credit report credit account data for the at least one credit account comprises providing the given user of the computing system implemented process for monitoring credit reports access to instructions for resolving the transaction discrepancy.

30. The computer program product for monitoring credit reports of claim 28, wherein:

providing the given user access to one or more resources to resolve the transaction discrepancy between the electronic transaction data associated with the at least one credit account obtained using the computing system implemented financial management system and the credit report credit account data for the at least one credit account comprises providing the given user of the computing system implemented process for monitoring credit reports access to one or more forms required for resolving the transaction discrepancy.

31. A computer program product for monitoring credit reports comprising:

a computer readable medium;

and computer program code, encoded on the computer readable medium, comprising computer readable instructions executed on a processor for:

obtaining electronic account data associated with a given user from two or more sources of electronic account data using a computing system implemented financial management system, the electronic account data including electronic account data associated with at least one credit account associated with the given user and electronic account data associated with at least one account other than a credit account associated with the given user, the computing system implemented financial management system having the capability to categorize electronic transaction data as income or expense electronic transaction data and to associate the electronic transaction data with one or more events;

storing the electronic account data obtained using the computing system implemented financial management system;

obtaining credit report credit account data for at least one credit account associated with the given user from a credit report;

storing the credit report credit account data;

analyzing the electronic account data associated with at least one credit account associated with the given user obtained using the computing system implemented financial management system and the credit report credit account data for at least one credit account associated with the given user;

detecting an account discrepancy between the electronic account data associated with at least one credit account associated with the given user obtained using the computing system implemented financial management system and the credit report credit account data for at least one credit account associated with the given user;

alerting the given user of the computing system implemented process for monitoring credit reports of the account discrepancy between the electronic account data associated with at least one credit account associated with the given user obtained using the computing system implemented financial management system and the credit report credit account data for at least one credit account associated with the given user; and alerting at least one financial institution maintaining at least one credit account associated with the given user of the account discrepancy between the electronic account data associated with at least one credit account associated with the given user obtained using the computing system implemented financial management system and the credit report credit account data for at least one credit account associated with the given user.

32. The computer program product for monitoring credit reports of claim 31, wherein:

the computing system implemented financial management system is a computing system implemented personal financial management system.

33. The computer program product for monitoring credit reports of claim 31, wherein:

alerting the given user of the computing system implemented process for monitoring credit reports of the account discrepancy between the electronic account data associated with at least one credit account associated with the given user obtained using the computing system implemented financial management system and the credit report credit account data for at least one credit account associated with the given user comprises generating a discrepancy report and providing the discrepancy report to the given user of the computing system implemented process for monitoring credit reports.

34. The computer program product for monitoring credit reports of claim 31, further comprising:

provifing the given user access to one or more resources to resolve the account discrepancy between the electronic account data associated with at least one credit account associated with the given user obtained using the computing system implemented financial management system and the credit report credit account data for at least one credit account associated with the given user.

35. The computer program product for monitoring credit reports of claim 34, wherein:

providing the given user access to one or more resources to resolve the account discrepancy between the electronic account data associated with at least one credit account associated with the given user obtained using the computing system implemented financial management system and the credit report credit account data for at least one credit account associated with the given user comprises providing the given user of the computing system implemented process for monitoring credit reports access to instructions for resolving the account discrepancy.

36. The computer program product for monitoring credit reports of claim 34, wherein:

providing the given user access to one or more resources to resolve the account discrepancy between the electronic account data associated with at least one credit account associated with the given user obtained using the computing system implemented financial management system and the credit report credit account data for at least one credit account associated with the given user comprises providing the given user of the computing system implemented process for monitoring credit reports access to one or more forms required for resolving the account discrepancy.

* * * * *